United States Patent
Senba

(10) Patent No.: US 7,319,216 B2
(45) Date of Patent: Jan. 15, 2008

(54) LIGHT RECEIVING UNIT AND IMAGE TAKING APPARATUS

(75) Inventor: Takehiko Senba, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/200,147

(22) Filed: Aug. 10, 2005

(65) Prior Publication Data

US 2006/0054794 A1  Mar. 16, 2006

(30) Foreign Application Priority Data

Sep. 10, 2004  (JP)  ............................. 2004-264054
Sep. 24, 2004  (JP)  ............................. 2004-276428

(51) Int. Cl.
*G02B 27/40* (2006.01)
(52) U.S. Cl. ................ 250/201.2; 250/226; 250/208.1; 348/337; 348/339; 348/340; 348/349; 359/634
(58) Field of Classification Search ................ 250/226; 348/337, 339, 340, 349; 359/634
See application file for complete search history.

(56) References Cited

U.S. PATENT DOCUMENTS

| 4,654,698 A | * | 3/1987 | Langworthy | ................. 348/238 |
| 5,023,723 A | * | 6/1991 | Date et al. | ................... 348/337 |
| 6,710,806 B1 | * | 3/2004 | Satoh | .......................... 348/350 |
| 6,822,801 B2 | * | 11/2004 | Yahagi et al. | ............... 359/634 |
| 2003/0151685 A1 | * | 8/2003 | la Grone | .................... 348/262 |

FOREIGN PATENT DOCUMENTS

| JP | 6-281881 A | 10/1994 |
| JP | 2000-201290 A | 7/2000 |
| JP | 2003-309858 A | 10/2003 |

* cited by examiner

*Primary Examiner*—Georgia Epps
*Assistant Examiner*—Stephen Yam
(74) *Attorney, Agent, or Firm*—Sughrue Mion, Pllc.

(57) ABSTRACT

A first prism 11*a* and a second prism 12*a* are joined together on a face-to-face basis. A dichroic mirror 13*a* is interposed into the junction plane to reflect only G-light. A first imaging device 111*a* receives the reflected light (G-light) with high sensitivity. In this manner, there is constructed an inexpensive light receiving unit 10*a* having the same visual sensitivity characteristic as eyes of a person. The light receiving unit 10*a* is disposed in an image taking apparatus.

32 Claims, 11 Drawing Sheets

LIGHT RECEIVING UNIT AND IMAGE TAKING APPARATUS

BACKGROUND OF THE INVENTION

1. Field of the Invention

The present invention relates a two-plate type of light receiving unit and an image taking apparatus having the light receiving unit.

2. Description of the Related Art

In the event that upon receipt of light of the subject a color image according to the subject light is displayed, the color image is displayed on a display screen in such a way that the subject light is separated into R-color, G-color and B-color, that is, three primary colors of light, so that image signals associated with the respective colors are created, and then elements associated with R-color, G-color and B-color, which are arranged on the display screen on a two-dimensional basis, are driven by the image signals.

To separate the subject light into R-color, G-color and B-color of three primary colors, according to a single-plate type of light receiving unit, R, G and B filters for color spectrum are arranged on a light receiving plane of a single imaging device, and according to a three-plate type of light receiving unit, a color separation mirror for spectrum (generally, as the color separation mirror, a dichroic mirror is often used and thus the color separation mirror is referred to as the dichroic mirror hereinafter) is disposed before each of three imaging devices (cf. for example, Japanese Patent Application Laid Open Gazette TokuKai Hei. 6-281881, and Japanese Patent Application Laid Open Gazette TokuKai 2000-201290).

According to the single-plate type of light receiving unit, the R, G and B filters are used to perform the color separation, and thus it involves a defect that a transmission loss of the filters causes sensitivity of the imaging device to lower, but it is relatively simple in the structure. Therefore, the single-plate type of light receiving unit is often used in a digital camera. O the other hand, according to the plural-plate type of light receiving unit, it involves a defect that the number of parts is increased to bring about complication of the structure, and as a result this may bring about increment of the cost. However, a dichroic mirror is used without the use of the color filters to form an image of the subject on the imaging device, so that a high sensitivity of image signal can be obtained. Thus, the plural-plate type of light receiving unit is used in a camera for broadcast.

Further, there is proposed a technology of improving the sensitivity of light receiving of the imaging device in such a way that antireflection films for preventing reflections of R-light, G-light and B-light are formed on light receiving surfaces of three imaging devices so that spectrums (R-light, G-light and B-light), which reach the light receiving surfaces of three imaging devices passing through the dichroic mirror, respectively, are received on the light receiving surfaces of the imaging devices with high sensitivity (cf. for example, Japanese Patent Application Laid Open Gazette TokuKai 2003-309858).

By the way, according to an image taking apparatus having a single-plate type of light receiving unit, it would happen that when a high-speed shutter is used to perform photography, a deterioration of the sensitivity of the imaging device causes a lack of exposure time, and as a result, this brings about a lack of brightness. In view of the foregoing, it is considered that a three-plate type of light receiving unit, which is higher in sensitivity than the single-plate type of light receiving unit, is used instead of the single-plate type of light receiving unit, in order that a sufficient light quantity is supplied to the light receiving surface of the imaging device even if the high-speed shutter is used. However, the use of the three-plate type of light receiving unit would bring about increment of the cost.

SUMMARY OF THE INVENTION

In view of the foregoing, it is an object of the present invention to provide an inexpensive light receiving unit having a high sensitivity characteristic that is hard to bring about a lack of brightness even if the high-speed shutter is used, and also to provide an image taking apparatus that suppresses an increment of the cost by means of arranging the inexpensive light receiving unit.

In the three-plate type of light receiving unit as well as the single-plate type of light receiving unit, in the event that a photographic operation is carried out without an auxiliary light in a scene that a field is somewhat dark, it happens that the shutter speed is longer in time than the camera shake limit. This would involve a problem of the camera shake.

In view of the foregoing, it is an object of the present invention to provide an image taking apparatus, in which camera shake and subject shake are hard to be striking up to a relatively darker field.

To achieve the above-mentioned objects, the present invention provides a light receiving unit comprising:

a color separation mirror that separates an incident light into a reflection light of a green wavelength band and transmission lights of a red wavelength band and a blue wavelength band;

a first imaging device that receives the reflection light from the color separation mirror to generate an image signal for green; and a second imaging device that separately receives the transmission lights from the color separation mirror into a light of the red wavelength band and a light of the blue wavelength band to generate an image signal for red and an image signal for blue.

As well known, the subject light is constituted of a visible light having wavelengths of about 4000 Å to about 7500 Å. It is considered that a light of green wavelength band of 5500 Å becomes the highest light in a visual sensitivity.

Thus, according to the light receiving unit of the present invention, the dichroic mirror is used to separate only the light of green wavelength band, which is considered as the highest light in a visual sensitivity for eyes of a person, and it is intended to constitute a light receiving unit having characteristics near the visual sensitivity characteristics of eyes of a person.

According to the structure as mentioned above, only the light of green wavelength band is separated, and thus receipt of the light by the first imaging device makes it possible to receive the light of green wavelength band with high sensitivity, since there is no need of transmission through color filters. In view of the fact that the light of green wavelength band is considered as the highest light in a visual sensitivity, there is provided such a structure that the light of the red wavelength band and the light of the blue wavelength band, which are received by the second imaging device, are subjected to the additive process. This feature makes it possible to implement a light receiving unit having characteristics near the visual sensitivity characteristics of eyes of a person.

According to the light receiving unit of the present invention, it is possible to implement the light receiving unit, which compensates for deterioration of the sensitivity that is a fault of a single-plate type of light receiving unit and suppresses an increment of the cost that is a defect of a three-plate type of light receiving unit. Thus, according to the light receiving unit of the present invention, it is possible to implement the light receiving unit, in which even if the high speed shutter is used as the conventional single-plate type of light receiving unit, it is hard to bring about the shortage of brightness, and the light receiving unit is extremely inexpensive in cost as compare with the three-plate type of light receiving unit.

It is also well known that integration of the light of the blue wavelength band that is short in wavelength to the light of the red wavelength band that is long in wavelength in its entirety makes it possible to obtain the brightness signal. As mentioned above, in the event that it is possible to provide a high sensitivity of the light of the green wavelength band, it is possible to substantially regard the integration of only the wavelength range of the light of the green wavelength band as the integration of all the lights including the light of the blue wavelength band and the light of the red wavelength band in its entirety. In other words, it is possible to treat the image signal created by the first imaging device as the brightness signal. Then, even if only the image signal created by the first imaging device is used as the brightness signal, it is possible to perform focusing with great accuracy.

In the light receiving unit according to the present invention as mentioned above, it is preferable that the first imaging device is a CMOS imaging device.

In the event that the first imaging device is a CMOS imaging device, it is possible to independently read pixels in various areas. This feature makes it possible to perform a multi-point focusing in accordance with the image signal created by the first imaging device. It is effectively used that the image signal created by the first imaging device is treated also as the brightness signal.

Disposing the light receiving unit onto an image taking apparatus makes it possible to implement an image taking apparatus having a focusing function with greater accuracy as well as characteristics of high sensitivity and high definition closer to the three-plate type of light receiving unit. Further, as mentioned above, according to the present invention, the light receiving unit is inexpensive, and thus disposing the light receiving unit onto an image taking apparatus makes it possible to suppress an increment of the cost of the image taking apparatus.

In the event that the light receiving unit is disposed onto an image taking apparatus to save the cost of the image taking apparatus, the present invention provides an image taking apparatus having an image taking optical system, which catches a subject light coming via the image taking optical system to generate image signals, wherein the image taking apparatus has a light receiving unit comprising:

a color separation mirror that separates the subject light coming via the image taking optical system into a reflection subject light of a green wavelength band and transmission subject lights of a red wavelength band and a blue wavelength band;

a first imaging device that receives the reflection subject light to generate an image signal for green; and a second imaging device that separately receives the transmission subject lights into of a light of the red wavelength band and a light of the blue wavelength band to generate an image signal for red and an image signal for blue.

In the image taking apparatus according to the present invention as mentioned above, it is preferable that the image taking apparatus further comprises a focusing device that performs a focusing control for the image taking optical system in accordance with the image signal obtained by the first imaging device.

In the image taking apparatus according to the present invention as mentioned above it is desirable that the first imaging device is a CMOS imaging device.

In the image taking apparatus according to the present invention as mentioned above, it is preferable that the first imaging device is a CMOS imaging device, and the focusing device reads from the CMOS imaging device only partial image signals associated with one or plural partial areas of a light receiving area for the subject light of the CMOS imaging device and performs the focusing control for the image taking optical system in accordance with the partial image signals.

In the image taking apparatus according to the present invention as mentioned above, it is acceptable that the image taking apparatus further comprises: a camera head having the image taking optical system and the light receiving unit; and a camera main frame on which the camera head is detachably mounted, the camera main frame being adapted to receive the image signal from the camera head to perform signal processing.

In the image taking apparatus according to the present invention as mentioned above, it is acceptable that the camera head has a focusing device that performs a focusing control for the image taking optical system in accordance with the image signal obtained by the first imaging device.

As mentioned above, according to the present invention, it is possible to implement an inexpensive light receiving unit having high sensitivity characteristics that are hard to bring about the shortage of brightness even if the high speed shutter is used, and also to implement an image taking apparatus capable of suppressing an increment of the cost by means of disposing the inexpensive light receiving unit.

To achieve the above-mentioned objects, the present invention provides an image taking apparatus having an image taking optical system, which catches a subject light coming via the image taking optical system to generate image signals, wherein the image taking apparatus comprises:

a first imaging device that receives a light of a green wavelength band of the subject light coming via the image taking optical system to generate an image signal for green;

a second imaging device that separately receives the subject lights coming via the image taking optical system into of a light of the red wavelength band and a light of the blue wavelength band to generate an image signal for red and an image signal for blue; and a shutter control section that independently controls a shutter speed of the first imaging device and a shutter speed of the second imaging device.

According to the image taking apparatus of the present invention as mentioned above, photography for the same subject can be carried out independently at mutually different shutter speeds on both the first imaging device and the second imaging device.

Since G-light is higher in the light receiving sensitivity as compared with R-light and B-light, when it is expected that the field brightness becomes relatively dark and for long time, photography is carried out in such a manner that the shutter speed of the first imaging device is higher than the shutter speed of the second imaging device. This feature makes it possible to obtain through the first imaging device image signals free from influence of the camera shake and subject blur, and to obtain through the second imaging device image signals involved in influence of the camera shake. The G-light free from influence of the camera shake, which is free from influence of the camera shake, is relatively higher in visual sensitivity than other lights. When the G-light is mixed with the R-light and B-light, it is possible to obtain a color image that is hard to be striking in influence of the camera shake.

This feature makes it possible to implement an image taking apparatus that is hard to be striking in the camera shake and the subject blur up to the darker field as compared to the conventional apparatus.

In the image taking apparatus according to the present invention as mentioned above, it is preferable that the image taking apparatus further comprises a color separation mirror that reflects a light of a green wavelength band of the subject light coming and transmits a light of a red wavelength band and a light of a blue wavelength band.

The use of the color separation mirror makes it possible to receive the subject light with the first imaging device and the second imaging device without attenuation of the subject light.

While the second imaging device needs a color filter for separately receiving R-light and B-light, the first imaging device needs no color filter, and thus a light quantity is increased. Also in this respect, the sensitivity of the first imaging device, that is, the sensitivity of G-light, is enhanced. As a result, according to the present invention, even if the field is darker as compared with the conventional one, it is possible to obtain a sufficient a quantity of exposure light by the corresponding that the sensitivity of the first imaging device is enhanced, even if the shutter speed is higher.

In the image taking apparatus according to the present invention as mentioned above, it is preferable that the shutter control section controls the shutter speed of the first imaging device and the shutter speed of the second imaging device in such a manner that the shutter speed of the first imaging device is same as the shutter speed of the second imaging device or higher than the shutter speed of the second imaging device in accordance with image taking conditions.

This feature makes it possible to perform photography at the higher speed of the first imaging device as compared with the shutter speed of the second imaging device in the event that the field is relatively dark and long time is required exceeding the limit of the camera shake, excepting, for example, a case where a sufficient subject illuminance is obtained (in this case, both the first imaging device and the second imaging device are of the high speed shutter), and a case where a subject illuminance is not at all obtained (in this case, both the first imaging device and the second imaging device are of the slow speed shutter).

In the image taking apparatus according to the present invention as mentioned above, it is preferable that the image taking conditions includes at least one of a subject illuminance, a focal length, a sensitivity of an imaging device, and F-value.

The shutter speeds of the first imaging device and the second imaging device are controlled in accordance with the photographic conditions such as the subject illuminance, the focal length, the sensitivity (ISO sensitivity) of an imaging device, and F-value. This feature makes it possible to control the shutter speed in accordance with a value measured by a light measurement device for the subject illuminance, the focal length and the sensitivity (ISO sensitivity) set up through an operation, and the F-value that is determined from the stop aperture and the focal length. Thus, it is possible for the image taking apparatus to perform a preferable photography under any photographic condition.

In the event that the shutter speed of the first imaging device is a high speed, and a shutter speed, which is lower than the shutter speed of the first imaging device, is set up to the second imaging device, it happens that influence of the camera shake of the second imaging device appears strongly.

In view of the foregoing, in the image taking apparatus according to the present invention as mentioned above, it is preferable that the shutter control section performs a shutter operation by plural number of times on at least the second imaging device to create image signals by plural number of times, and the image taking apparatus further comprises a blur correction section that corrects blur of the image signals by plural number of times and superposes the image signals on one another.

This feature makes it possible to correct the camera shake and the subject blur and also to obtain the image signal of the substantially same sensitivity as photography with the low speed shutter through plural number of times.

In the image taking apparatus according to the present invention as mentioned above, it is preferable that the shutter control section performs the shutter operation plural number of times in synchronism with the first imaging device and the second imaging device to generate image signals plural number of times, and the blur correction section detects blur of the image signals of a plural number of times that are obtained by the first imaging device in accordance with the image signals of a plural number of times, and corrects the blur of the image signals of a plural number of times that are obtained by the second imaging device in accordance with a result of the blur detection and superposes the image signals of a plural number of times that are obtained by the second imaging device on one another.

It is desirable that the second imaging device creates image signals of a plural number of times so as to correct the blur. However, when the subject illuminance becomes dark, it happens that it is difficult that the blur correction section corrects the blur of the image signals of a plural number of times.

In view of the foregoing, in the event that the subject illuminance is relatively dark, the first imaging device, which is higher in sensitivity than the second imaging device, also creates image signals of a plural number of times. This feature makes it possible that the blur correction section corrects the blur.

As mentioned above, according to the present invention, it is possible to implement an image taking apparatus that is hard to be striking in the camera shake and the subject blur up to the darker field as compared with the conventional one.

DETAILED DESCRIPTION OF PREFERRED EMBODIMENTS

Embodiments of the present invention will be described with reference to the accompanying drawings.

Figure 1:
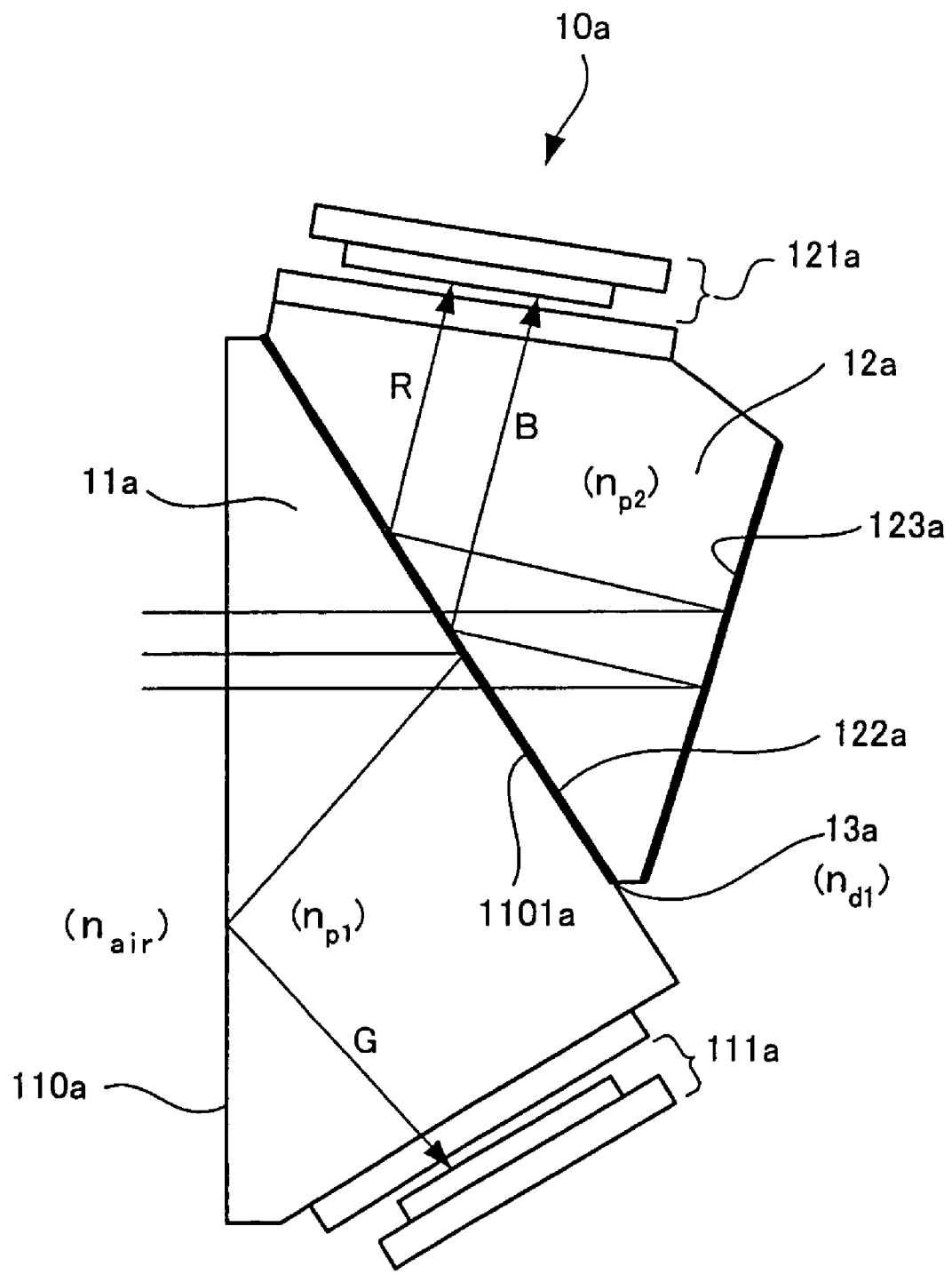
FIG. 1 is a view of a light receiving unit according to an embodiment of the present invention.

FIG. 1 is a view of a light receiving unit according to an embodiment of the present invention.

A light receiving unit 10a has two prisms 11a and 12a of polyhedron. One plane 1101a of the multiple planes of the prism 11a and one plane 122a of the multiple planes of the prism 12a are joined together. According to the present embodiment, in order to separate an incident light into a green wave-length band of light (hereinafter it is referred to as G-light), a red wave-length band of light (hereinafter it is referred to as R-light), and a blue wave-length band of light (hereinafter it is referred to as B-light), a dichroic mirror 13a, in which G-light is reflected and R-light and B-light are transmitted, is interposed between the prisms 11a and 12a.

Here, there will be explained functions of the dichroic mirror 13a and two prisms 11a and 12a.

The dichroic mirror 13a is one in which a reflection film that reflects G-light is coated. According to the dichroic mirror 13a, when an incident light, which is incident upon an incident plane 110a of the first prism 11a, progresses through the prism 11a and reaches the dichroic mirror 13a, only G-light of the incident light is reflected on the surface of the dichroic mirror 13a. The G-light reflected on the dichroic mirror 13a returns to the incident plane 110a. According to the present embodiment, an angle of the joint plane 1101a and an angle of the incident plane 110a are set in accordance with a refractive index ($n_{air}$) of an air layer and a refractive index ($n_{p1}$) of the first prism 11a in such a way that when the light, which is returned from the joint plane 1101a, reaches the incident plane 110a, the total reflection occurs at the incident plane 110a. Accordingly, the G-light returned to the incident plane 110a is subjected to the total reflection at the incident plane 110a. A first imaging device 111a is disposed in a travelling direction of the G-light that is subjected to the total reflection at the incident plane 110a. Thus, the first imaging device 111a receives the G-light.

The transmission lights (R-light and B-light) other than G-light, which transmit through the dichroic mirror 13a, are reflected on a mirror 123a formed at the edge of the prism 12a and are returned to the joint plane. In a similar fashion to that of the G-light, an angle of the mirror 123a and an angle of a joint plane 122a are set in accordance with a refractive index ($n_{p2}$) of the second prism 12a and a refractive index ($n_{d1}$) of the dichroic mirror 13a in such a way that the total reflection occurs at the joint plane 122a. Accordingly, the R-light and the B-light, which are incident to the joint plane 122a, is subjected to the total reflection. A second imaging device 121a receives the R-light and the B-light. On a surface of the second imaging device 121a, R-filters and B-filters are alternatively arranged, so that the R-light and the B-light are separately received.

In this manner, the first imaging device 111a receives the G-light that is the reflection light of the dichroic mirror 13a, and the transmission light of the dichroic mirror 13a is separated by the R-filters and B-filters into the R-light that is light of the red wavelength band and the B-light that is light of the blue wavelength band.

The above-mentioned structure makes it possible that the first imaging device 111a receives the G-light with greater sensitivity. This feature makes it possible to implement a light receiving unit that has the same high sensitivity characteristic as the three-plate type of light receiving unit as to the G-light, and is more inexpensive than the three-plate type of light receiving unit by a one-plate.

The use of such an inexpensive light receiving unit makes it possible to suppress an increment of the cost of the image taking apparatus.

Figure 2:
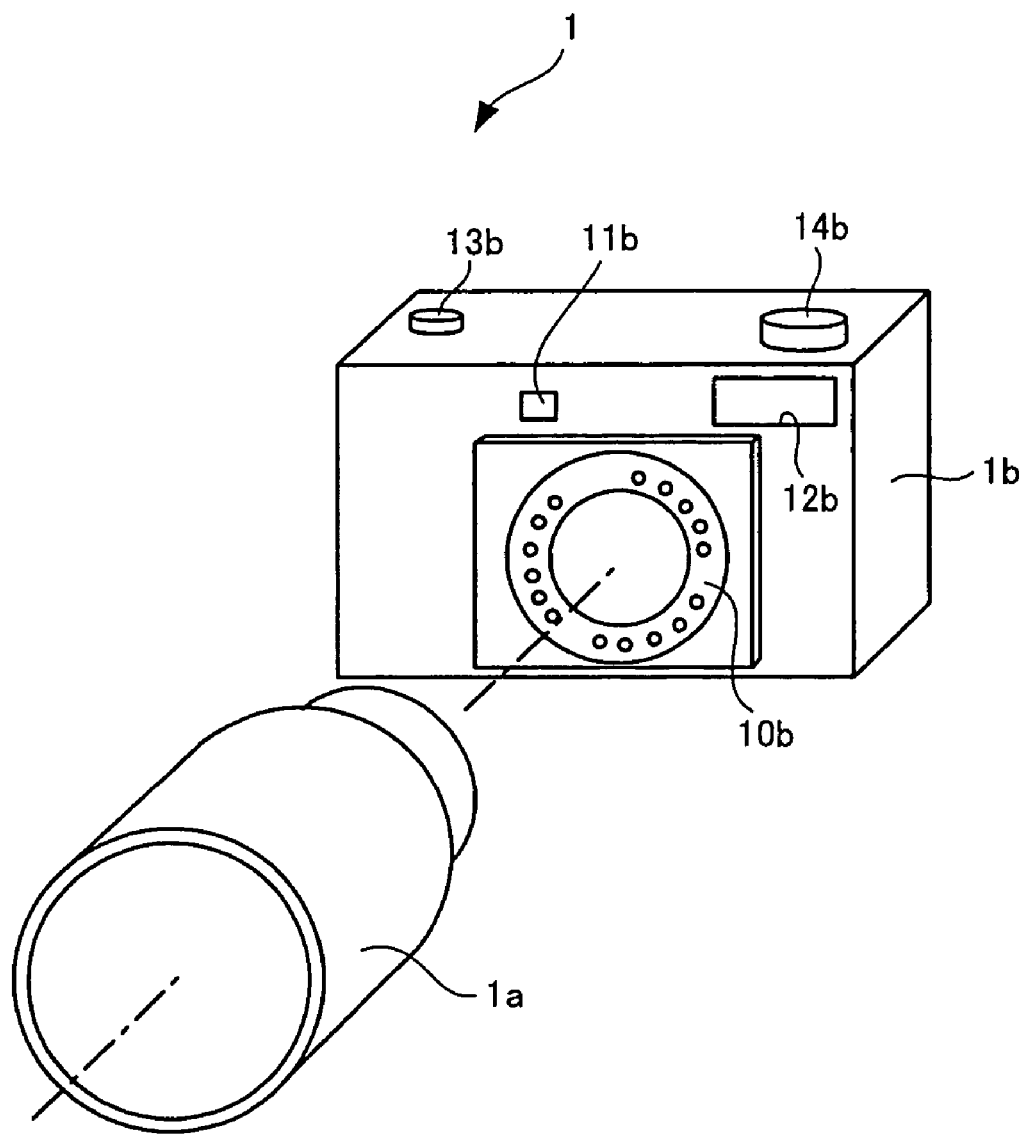
FIG. 2 is a perspective view of an image taking apparatus comprising a camera head including a light receiving unit of the present invention, and a camera main frame.

FIG. 2 is a perspective view of an image taking apparatus comprising a camera head including a light receiving unit of the present invention, and a camera main frame.

FIG. 2 shows a camera head 1a having an image taking optical system and an imaging device, and a camera main frame 1b that receives an image signal from the camera head 1a, which is detachably mounted on the camera main frame 1b, to perform a signal processing. According to the present embodiment, the camera head 1a is provided with the light receiving unit 10a shown in FIG. 1, and a focusing device using the first imaging device 111a of the light receiving unit 10a. The structure of the focusing device will be described later.

Here, there will be briefly described the external structure of the camera head 1a and the camera main frame 1b constituting the camera system.

At the center of the camera main frame 1b, there is disposed a head mount 10b having a number of mounting contacts. Also at the side of the camera head 1a, there is provided the similar mount section. When the camera head 1a is mounted on the camera main frame 1b along the dashed line shown in FIG. 2 in such a way that the positions of the mounting contacts of both the camera head 1a and the camera main frame 1b meet together, the mounting contacts are connected to one another so that the camera head 1a is electrically connected to the camera main frame 1b.

The mounting contacts are allotted for communications and electric power supply, so that a communication from the camera main frame 1b to the camera head 1a is carried out, a communication from the camera head 1a to the camera main frame 1b is carried out, and a power supply from the camera main frame 1b to the camera head 1a is carried out.

Upper the head mount 10b, there is disposed an AWB sensor 11b that detects a sort of a light source at the time of photography. What is meant by the sort of the light source is that the light source is concerned with, for example, sunlight or a fluorescent light. When the AWB sensor 11b detects the sort of the light source, an appropriate color temperature is set up to a digital signal processing section, which will be described later, so that the regulation for the optimal white balance is performed. At the side of the AWB sensor 11b, there is disposed a flash light emission window 12b. The camera main frame 1b incorporates therein a flash light emission apparatus for emitting a flashlight through the flash light emission window 12b. On the top of the body of the camera main frame 1*b*, there are disposed a release button 13*b* and a mode dial 14*b*. The mode dial 14*b* is used to select a photography mode and a reproduction mode. In the photography mode, it is further selected between a still picture image photography mode and a dynamic picture image photography mode. Incidentally, it is noted that FIG. 1 shows by way on example one of a plurality of sorts of camera heads and one of a plurality of sorts of camera main frames.

Now there will be explained the internal structure of the camera head 1*a* in conjunction with FIG. 3.

Figure 3:
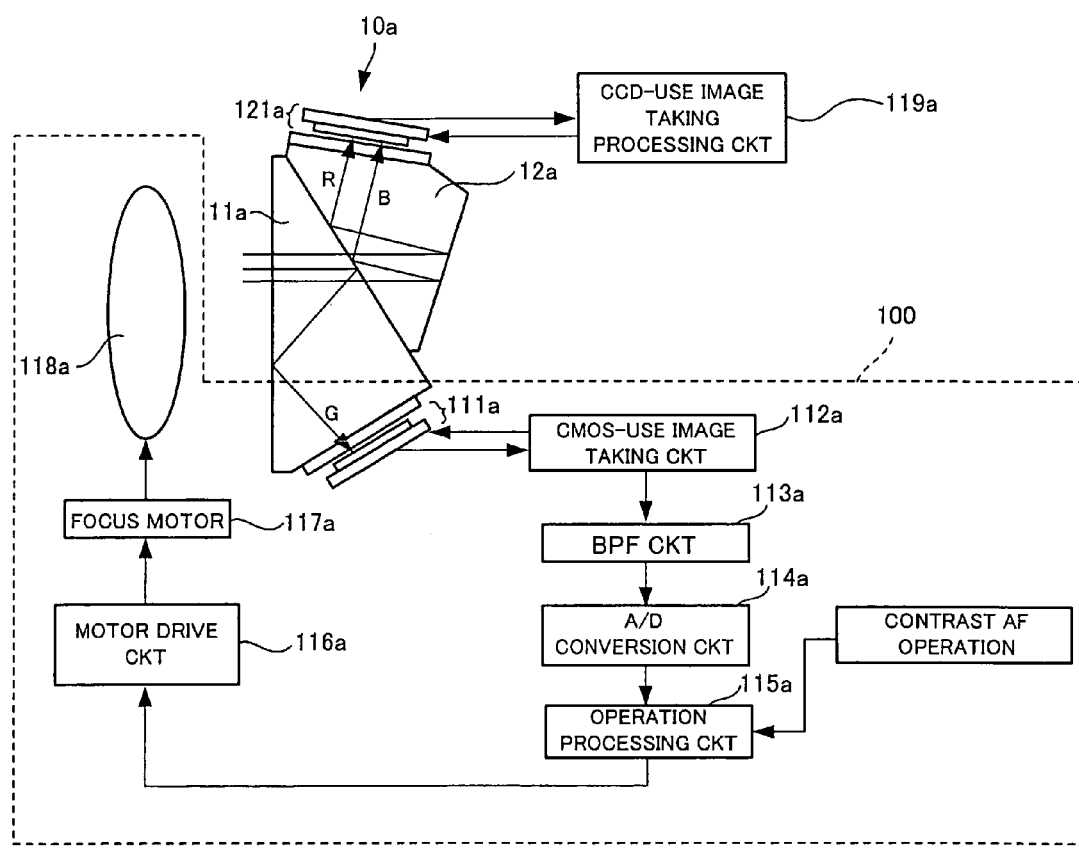
FIG. 3 is a block diagram of a focusing apparatus disposed in a camera head.

FIG. 3 is a block diagram showing the internal structure of the camera head 1*a*.

The camera head 1*a* shown in FIG. 3 comprises the light receiving unit 10*a*, which is explained with reference to FIG. 1, a focusing apparatus 100 using the first imaging device 111*a* of the light receiving unit 10*a*, and a focus lens 118*a* of an image taking optical system. The image taking optical system further comprises an image taking lens including the focus lens and an aperture. While it is not illustrated, the image taking optical system further comprises an interface that supplies to the camera main frame 1*b* image signals to be outputted from a CCD imaging processing circuit 119*a* and a CMOS imaging circuit 112*a*. The similar interface is provided at the end of the camera main frame 1*b*. The interface receives the image signals at the end of the camera main frame 1*b* so that the signal processing section of the camera main frame 1*b* performs the signal processing. At the side of the camera main frame 1*b*, an image based on the image signal subjected to the signal processing is displayed on the display screen or recorded on a recording medium.

Next, there will be explained the structure of the focusing apparatus 100 of the camera head 1*a*.

The focusing apparatus 100 shown in FIG. 3 comprises: an arithmetic processing circuit 115*a*; the first imaging device 111*a*, the CMOS imaging circuit 112*a*, a BPF (band pass filter) circuit 113*a*, and an A/D conversion circuit 114*a*, which supply image signals for computing the contrast to the arithmetic processing circuit 115*a* as control means; and a motor driving circuit 116*a* for driving a focusing motor 117*a* in accordance with an instruction from the arithmetic processing circuit 115*a*.

To operate the focusing apparatus 100, first, the arithmetic processing circuit 115*a* instructs the motor driving circuit 116*a* that the focusing motor 117*a* drives a focus lens 118*a* of the image taking optical system to move along the optical axis from a position associated with the closest point of the subject distance to a position associated with the farthest point. While the focus lens 118*a* is driven, the arithmetic processing circuit 115*a* issues an instruction to supply a timing signal for each a predetermined time from the CMOS imaging circuit 112*a* to the CMOS imaging device 111*a* that is the first imaging device so that the CMOS imaging device 111*a* outputs an image signal for green to the CMOS imaging circuit 112*a* for each a predetermined time in accordance with the timing signal. The CMOS imaging circuit 112*a* receives the image signal for green and supplies the image signal for green to the BPF circuit 113*a* so as to remove noises involved in the image signal for green. Upon receipt of the image signal for green, the BPF circuit 113*a* removes as unnecessary signal an image signal based on a wavelength band of light other than a green wavelength band, which is included in the image signal for green, so as to generate a pure image signal for green, and supply the pure image signal for green to the A/D conversion circuit 114*a*, and then to the arithmetic processing circuit 115*a*. The arithmetic processing circuit 115*a* computes a ratio of brightness between the subject and the background or the field in accordance with the image signal for green in form of contrast and performs a contrast AF (auto focus) operation that the subject is located at the position where the contrast is the maximum. In this manner, the arithmetic processing circuit 115*a* performs an operation for a position of the focus lens 118*a* to be driven. In order to show that the arithmetic processing circuit 115*a* performs the contrast AF operation, FIG. 3 shows that the arithmetic processing circuit 115*a* performs the contrast AF operation on a block basis.

After the position of subject (the subject distance), which is caught by the image taking lens including the focus lens 118*a*, is determined from image signals obtained for each a predetermined time through the contrast AF operation, the focus position associated with the determined subject distance is decided as the driving position of the focus lens 118*a*, and the arithmetic processing circuit 115*a* instructs the motor driving circuit 116*a* to drive the focus lens 118*a* to the focus position by the focusing motor 117*a*.

According to the present embodiment, as the first imaging device 111*a*, the CMOS imaging device is used. According to the CMOS imaging device 111*a*, while the CCD imaging device has to perform the reading for each line, it is possible to perform individually the reading for each partial area. Therefore, according to the present embodiment, it is possible to perform not only a focusing of only the center of the subject but also a multi-point focusing using a plurality of partial areas in the light receiving area.

Figure 4:
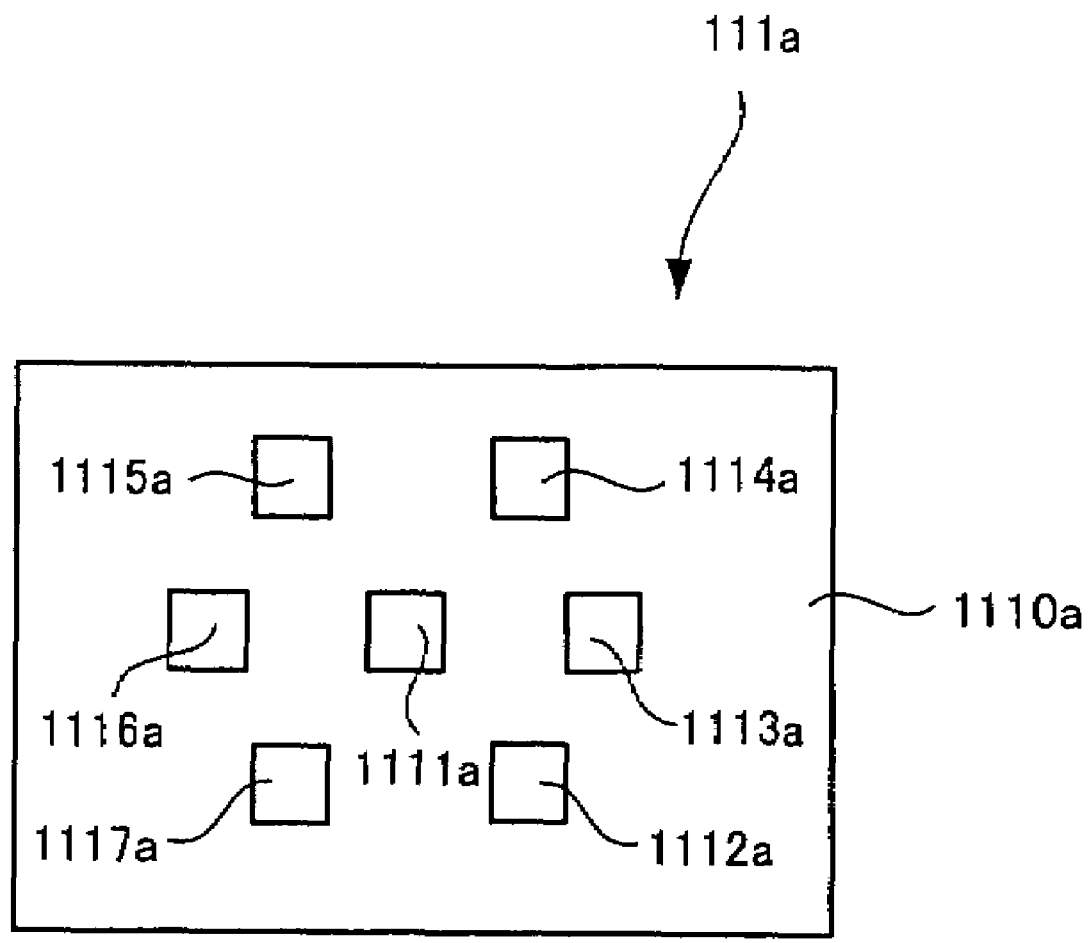
FIG. 4 is an explanatory view useful for understanding an operation wherein a multi-point focusing is performed in a number of partial areas.

FIG. 4 is an explanatory view useful for understanding an operation wherein a multi-point focusing is performed in a number of partial areas.

FIG. 4 shows the light receiving area of the CMOS imaging device 111*a* that is the first imaging device 111*a*.

As shown in FIG. 4, a plurality of partial areas 1111*a* to 1117*a* is established in a light receiving area 1110*a* for the subject light of the CMOS imaging device 111*a*. It is possible to read only the associated partial image signals (G-light) from the partial areas 1111*a* to 1117*a* so that the focusing of the image taking optical system can be carried out in accordance with the partial image signals.

The partial image signals for green are read from the partial areas so that the arithmetic processing circuit performs the multi-point focusing in accordance with the partial image signals. This feature makes it possible to avoid such a problem that when it is intended that the image taking apparatus of FIG. 2 is used to take a picture of the subject in which for example two persons stand at intervals, the focusing apparatus 100 erroneously focuses on the center of the two persons standing at intervals, that is, on the infinite-point.

As mentioned above, the first imaging device is of very high sensitivity. And thus even if a high-speed shutter is used, it is possible to implement a light receiving unit hard to bring about a luminance shortage. Further, according to the present invention, it is possible to implement an image taking apparatus capable of suppressing an increment of the cost by means of adopting a light receiving unit that is inexpensive by the corresponding less one plate as compared with a three-plate type of light receiving unit.

Further, according to the present embodiment as mentioned above, in order to thin a thickness in a direction of the optical axis as less as possible, two prisms are joined together as shown in FIG. 3. However, an arrangement of FIG. 5 makes it possible to provide the more simple structure, and thereby contributing to a further decrement of the cost of a light receiving unit.

Figure 5:
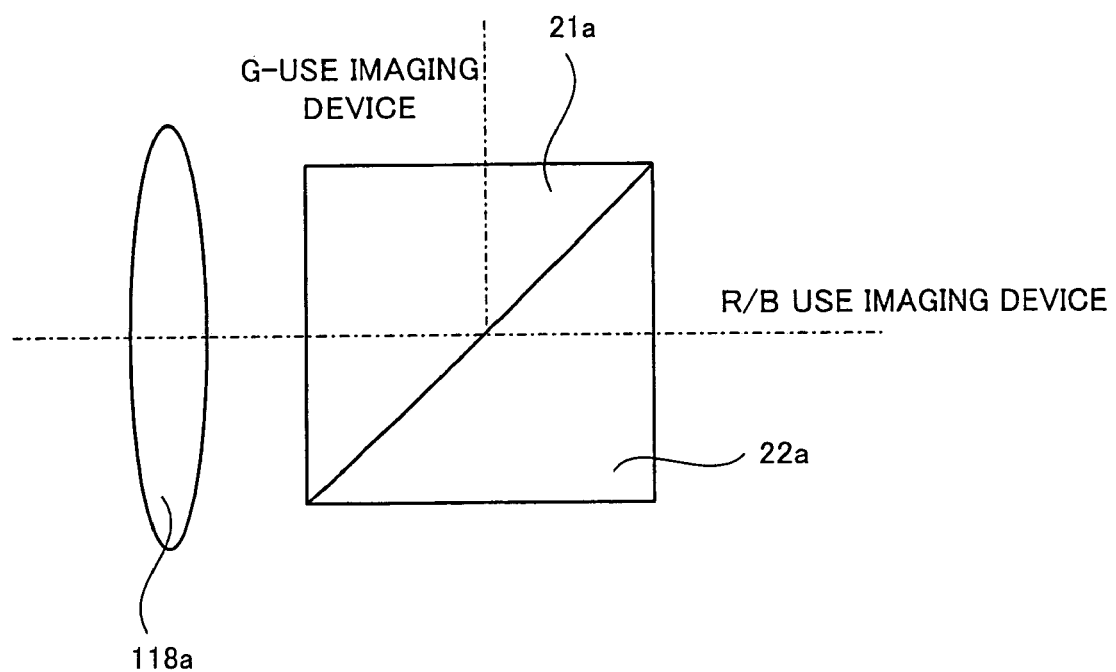
FIG. 5 is a view of a light receiving unit according to another embodiment of the present invention.

FIG. 5 is a view of a light receiving unit according to another embodiment of the present invention.

As shown in FIG. 5, two prisms 21a and 22a are joined together. This arrangement makes it possible to provide a simple structure, and thereby contributing to a further decrement of the cost of a light receiving unit, while the thickness in the direction of the optical axis is thicker somewhat as compared with one shown in FIG. 3. In the event that it is permitted that the thickness in the direction of the optical axis is thick somewhat, this structure makes it possible to contribute to a further decrement of the cost of a light receiving unit and an image taking apparatus.

Next, there will be explained another embodiment of the present invention.

Figure 6:
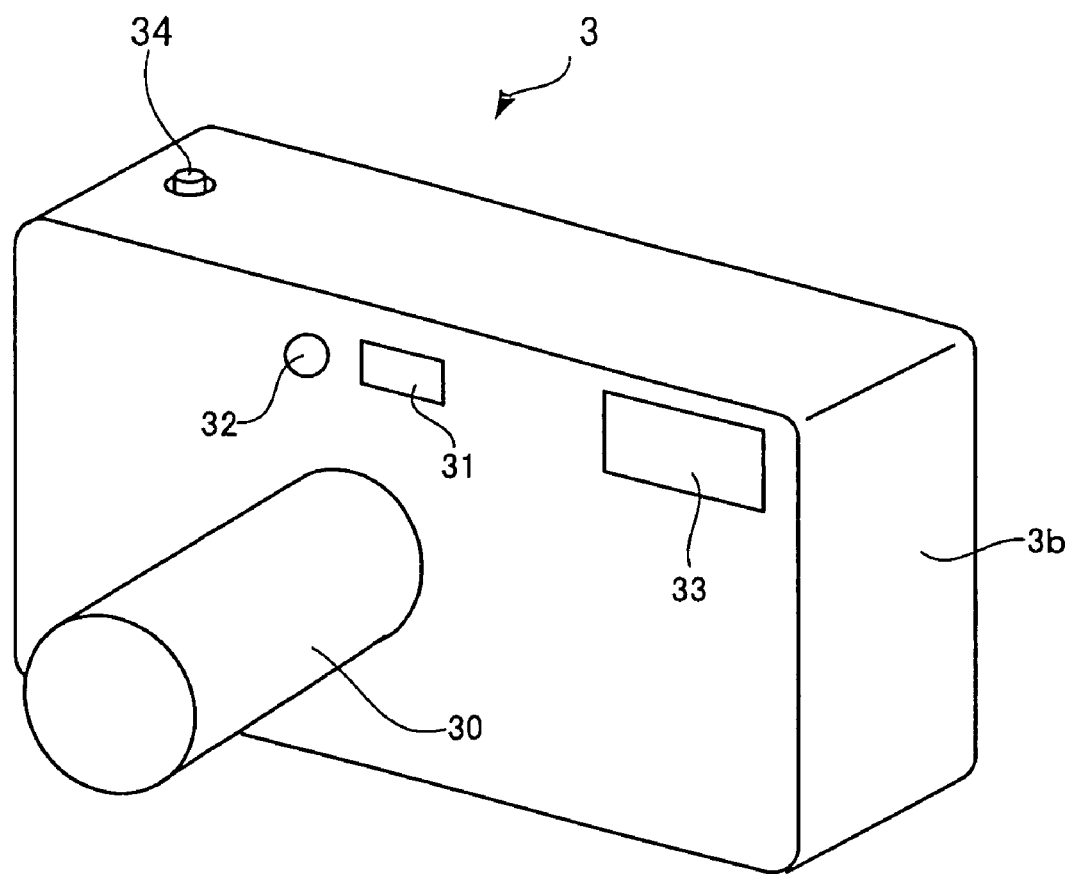
FIG. 6 is a view of the image taking apparatus onto which the light receiving unit of FIG. 1 is mounted.

FIG. 6 is a view of an image taking apparatus 3 onto which the light receiving unit of FIG. 1 is mounted.

As shown in FIG. 6, a lens barrel 30 is disposed at the center of a body 3b of the image taking apparatus 3. The lens barrel 30 incorporates therein an image taking optical system. After the image taking optical system, the light receiving unit 10a shown in FIG. 1 is incorporated so that the subject is image-formed on the imaging device 111a for the G-light and the imaging device 121a for the RB-lights. At the upper portion of the lens barrel 30, there is disposed a finder 31. At the adjacent portion of the finder 31, there is disposed a light measurement window 32. At the opposite side of the light measurement window 32, there is disposed a flash light emitting window 33. On the top of the body, there is disposed a shutter button 34. The subject light is introduced through the light measurement window 32 to a light measurement apparatus so that the light measurement apparatus detects the subject illuminance.

Now there will be explained the internal structure of the image taking apparatus 3 of FIG. 6 in conjunction with FIG. 7.

Figure 7:
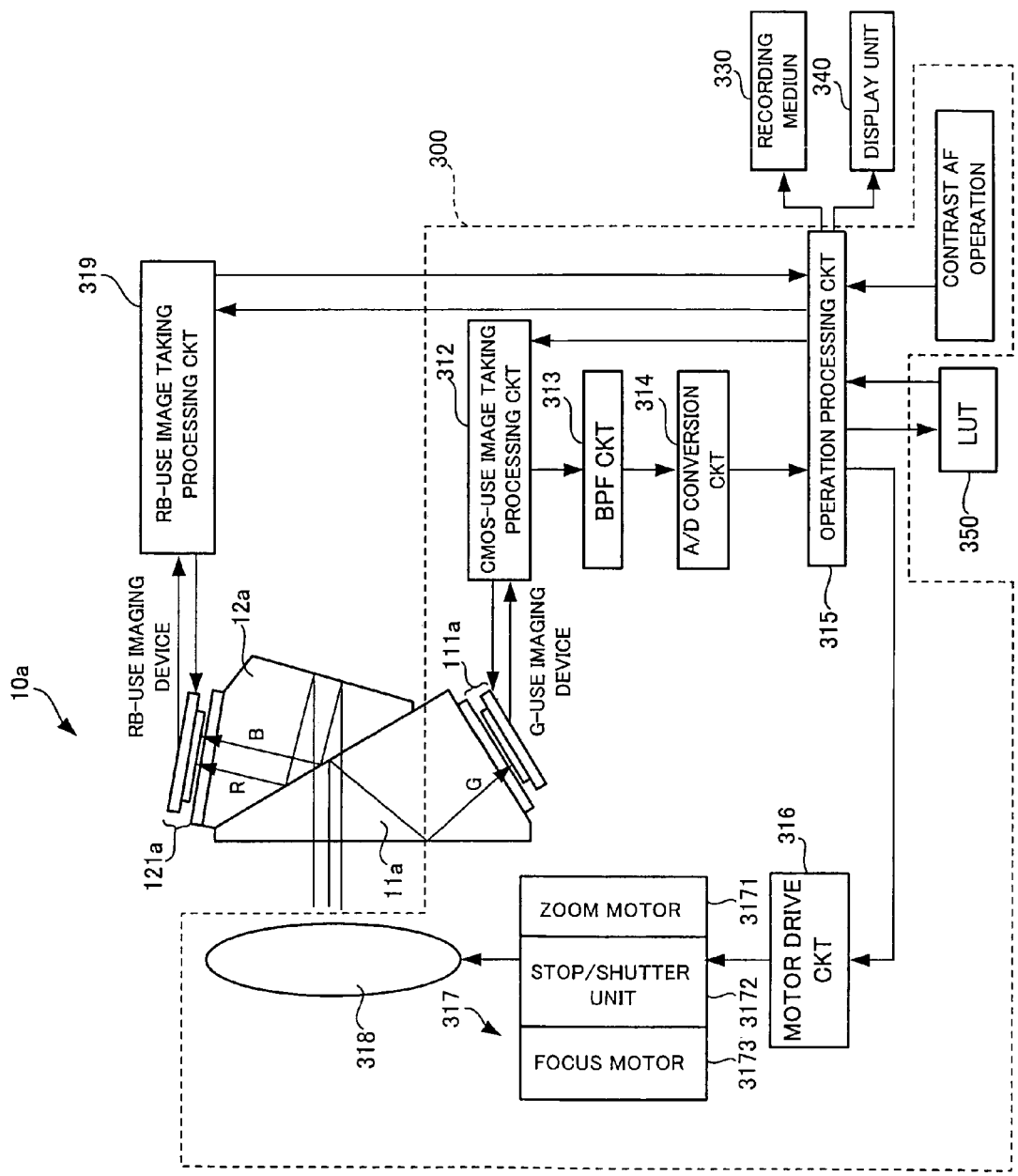
FIG. 7 is a block diagram of the internal structure of the image taking apparatus of FIG. 6.

FIG. 7 is a block diagram of the internal structure of the image taking apparatus 3.

As shown in FIG. 7, the image taking apparatus 3 is provided with an arithmetic processing circuit 315 for generating a color image signal in accordance with a green use of image signal generated by the imaging device 111a for the G-light, and a red use of image signal and a blue use of image signal generated by the imaging device 121a for the R-light and the B-light, of the light receiving unit 10a. The arithmetic processing circuit 315 controls a RB use of image taking processing circuit 319 and a CMOS use of image taking processing circuit 312. The RB use of image taking processing circuit 319 controls an operation of the imaging device 121a for the R-light and the B-light. The CMOS use of image taking processing circuit 312 controls an operation of the imaging device 111a for the G-light.

The arithmetic processing circuit 315 serves also as a control section of a focusing apparatus 300. The focusing apparatus 300 comprises: an arithmetic processing circuit 315 that serves as the control section; the imaging device 111a for the G-light, which supplies an image signal that causes the arithmetic processing circuit 315 to compute the contrast, a CMOS imaging circuit 312, a BPF (band pass filter) circuit 313, and an A/D conversion circuit 314; and a motor drive circuit 316 for driving a focus motor 3173 in accordance with an instruction from the arithmetic processing circuit 315 to move a focus lens 318.

To operate the focusing apparatus 300, first, the arithmetic processing circuit 315 issues to the motor drive circuit 316 such an instruction that the focus motor 3173 moves the focus lens 318 of the image taking optical system along the optical axis from a position associated with the closest point of the subject distance to a position associated with the farthest point. While the focus lens 318 is driven, the arithmetic processing circuit 315 issues an instruction to supply a timing signal for each a predetermined time from the CMOS imaging circuit 312 to the CMOS imaging device 111a that is the first imaging device so that the CMOS imaging device 111a outputs an image signal for green to the CMOS imaging circuit 112a for each a predetermined time in accordance with the timing signal. The CMOS imaging circuit 312 receives the image signal for green and supplies the image signal for green to the BPF circuit 313 so as to remove noises involved in the image signal for green. Upon receipt of the image signal for green, the BPF circuit 313 removes as unnecessary signal an image signal based on a wavelength band of light other than a green wavelength band, which is included in the image signal for green, so as to generate a pure image signal for green, and supply the pure image signal for green to the A/D conversion circuit 314. The A/D conversion circuit 314 performs a conversion of a signal from the analog image signal to a digital image signal, and then supplies the digital image signal to the arithmetic processing circuit 315. The arithmetic processing circuit 315 computes a ratio of brightness between the subject and the background or the field in accordance with the image signal for green in form of contrast and performs a contrast AF (auto focus) operation that the subject is located at the position where the contrast is the maximum. In this manner, the arithmetic processing circuit 315 determines the subject distance from the photosensitive surface of the imaging device of the camera to a position wherein the subject is located, and performs an operation for a focusing position of the focus lens 318 according to the thus determined subject distance. In order to show that the arithmetic processing circuit 315 performs the contrast AF operation, FIG. 7 shows that the arithmetic processing circuit 315 performs the contrast AF operation on a block basis.

After the arithmetic processing circuit 315 performs an operation for a focusing position, the arithmetic processing circuit 315 instructs the motor drive circuit 316 to drive the focus lens 318 to the focusing position so as to move the focus lens 318 to the driving position.

In the event that the image taking apparatus is used to carry out the image taking operation, the arithmetic processing circuit 315 performs the contrast AF operation whenever the direction of the lens is varied, so that the focusing is adjusted always.

In this manner as mentioned above, when the focusing is adjusted always, it is possible to always display on the display screen of a display unit 340 an image in focus according to the image signal that is subjected to the image processing by the arithmetic processing circuit 315. After a user performs the image taking operation in a shutter chance while the user looks at the subject on the display screen, the arithmetic processing circuit 315 instructs the CMOS use of image taking processing circuit 312 so that the imaging device 111a for G-light receives a signal informing of an exposure start timing, while the arithmetic processing circuit 315 instructs a RB use of image taking processing circuit 319 so that the imaging device 121a for R-light and B-light receives signals informing of exposure start timings, respectively. Upon receipt of the signal informing the exposure start timing, the imaging device 111a for G-light receives G-light and the imaging device 121a for R-light and B-light receives R-light and B-light, respectively. Then, the arithmetic processing circuit 315 supplies the signal informing an exposure over timing to the imaging device 111a for G-light, and the imaging device 111a for G-light supplies the image signal for green to the CMOS use of image taking processing circuit 312 in synchronism with the signal informing an exposure over timing. Further, the arithmetic processing circuit 315 supplies the signal informing an exposure over timing to the imaging device 121a for R-light and B-light in timing that is the same as the exposure over timing or later than the exposure over timing, and also supplies the image signal for red and the image signal for blue to the RB use of image taking processing circuit 319. The arithmetic processing circuit 315 corresponds to the shutter control section referred to in the present invention.

The image signal for green, the image signal for red and the image signal for blue are supplied via those processing circuits to the arithmetic processing circuit 315 that serves also as the shutter control section, so that the arithmetic processing circuit 315 creates a color image according to the additive process. Further, the arithmetic processing circuit 315 performs compression processing for an image signal representative of the color image. The image signal, which is subjected to the compression processing, is recorded in form of an image file on a recording medium.

The motor drive circuit 316 includes an aperture of an aperture shutter unit 3172 and a driving section for driving a zoom motor 3171 of the image taking optical system. When a user operates a zoom switch (not illustrated) provided on the body 3b of the image taking apparatus 3, the arithmetic processing circuit 315 controls the motor drive circuit 316 in accordance with the operation of the zoom switch to rotate the zoom motor 3171 and to move the zoom lens coupled to the zoom motor 3171, so that the focal length is adjusted. Further, driving of the stop plate of the aperture shutter unit 3172 makes it possible to dispose stops having different apertures on an optical axis. Thus, the arithmetic processing circuit 315 controls the stop and the zoom lens, and accordingly it is possible to compute F-value from the disposition of the zoom lens and the aperture.

While it is not directly concerned with the present invention, according to the present embodiment, there is provided a LUT 350 so as to avoid necessity for every arithmetic operation of the shutter speed by the arithmetic processing circuit 315 that serves as also the shutter control section. This feature makes it possible to reduce the processing time. A provision of the LUT 350 makes it possible that the arithmetic processing circuit 315 refers to the LUT 350 to readily read the subject illuminance, the focal distance, the sensitivity of the imaging device, and the shutter speed according to F-value. A signal, which is representative of the read shutter speed, is fed to the RB use of image taking processing circuit 319 and the CMOS use of image taking processing circuit 312. This feature makes it possible to drive the imaging device 111a for the G-light with the high speed shutter, or to drive the imaging device 121a for the R-light and the B-light with the low speed shutter.

This arrangement makes it possible to read the optimal values of both the shutter speeds through simply referring to the LUT 350 without necessity for every arithmetic operation of the shutter speed by the arithmetic processing circuit 315 that serves as also the shutter control section. Thus, it is possible to implement an image taking apparatus capable of independently driving both the imaging devices at the associated shutter speed.

As mentioned above, in the event that the electronic shutters of both the imaging devices can be driven independently of one another, it is possible to drive only the shutter speed of the imaging device for the G-light at the high speed shutter in order to suppress the influence of the camera shake, when the brightness of field becomes relatively dark and it is required for the shutter speed exceeding the limit of the camera shake. Then, the arithmetic processing circuit 315 creates a color image signal according to the additive process of a G-color signal representative of G-light created by the first imaging device, which is high sensitive, and a B-color signal representative of B-light and a R-color signal representative of B-light created by the second imaging device, which is driven at the shutter speed exceeding the limit of the camera shake. Thus, it is possible to obtain a color image signal, which is emphasized in G-light free from an influence of the camera shake. When the color image according to the color image signal thus obtained is displayed, it is possible to visually recognize the color image as a color image that is hard to be striking in influence of the camera shake in its entirety by the corresponding in which G-light completely free from an influence of the camera shake is emphasized even if R-light and B-light are effected by the camera shake.

Hereinafter, there will be explained how the arithmetic processing circuit 315 performs the processing after the arithmetic processing circuit 315 controls the shutter speed of both the imaging device 111a for the G-light and the imaging device 121a for the R-light and the B-light to obtain the image signal for the G-light and the image signal for the R-light and the B-light.

Figure 8:
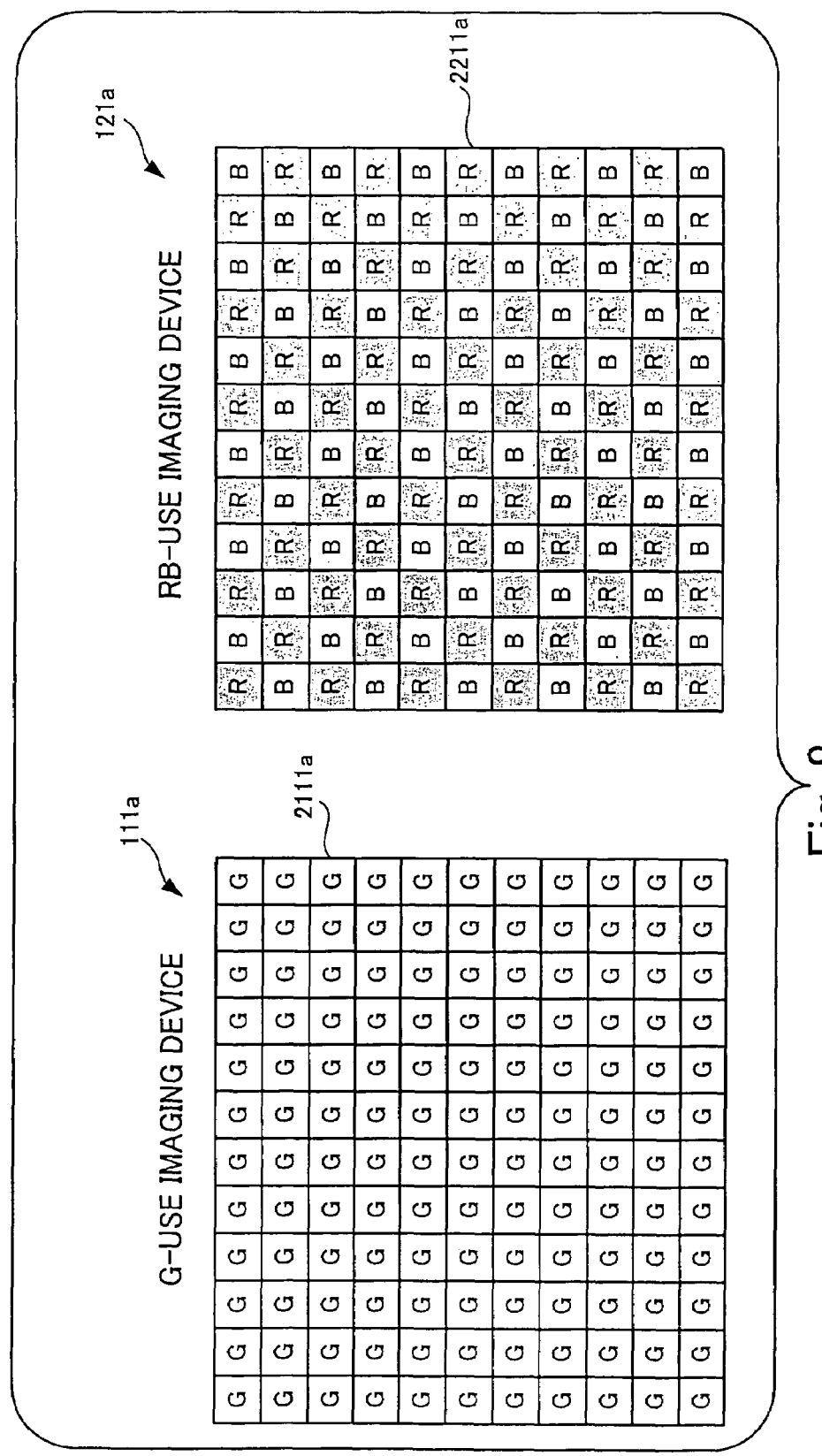
FIG. 8 is an explanatory view useful for understanding light receiving areas of imaging devices for G-use and imaging devices for RB-use.

FIG. 8 is an explanatory view useful for understanding light receiving areas of imaging devices for G-light use and imaging devices for RB-light use.

A part (a) of FIG. 8 shows a light receiving area 2111a of the imaging device 111a for the G-light. A part (b) of FIG. 8 shows a light receiving area 2211a of the imaging device 121a for the R-light and the B-light.

As shown in the part (a) of FIG. 8, the imaging device 111a for the G-light receives only the G-light, and thus all the pixels are for the G-light. As a result, it is possible to create an image signal for green with high definition. To the contrary, as shown in the part (b) of FIG. 8, the imaging device 121a for the R-light and the B-light separately receives the R-light and the B-light through the filters. Thus, it would be understood that resolution of the imaging device 121a for the R-light and the B-light is half of resolution of the first imaging device 111a for the G-light.

The image signals for green, red and blue are fed via the CMOS use of image taking processing circuit 312 and the RB use of image taking processing circuit 319 to the arithmetic processing circuit 315. The arithmetic processing circuit 315 performs the signal processing for pixel mixing and additive process to create a color image.

Hereinafter, there will be explained how the color image is created.

Figure 9:
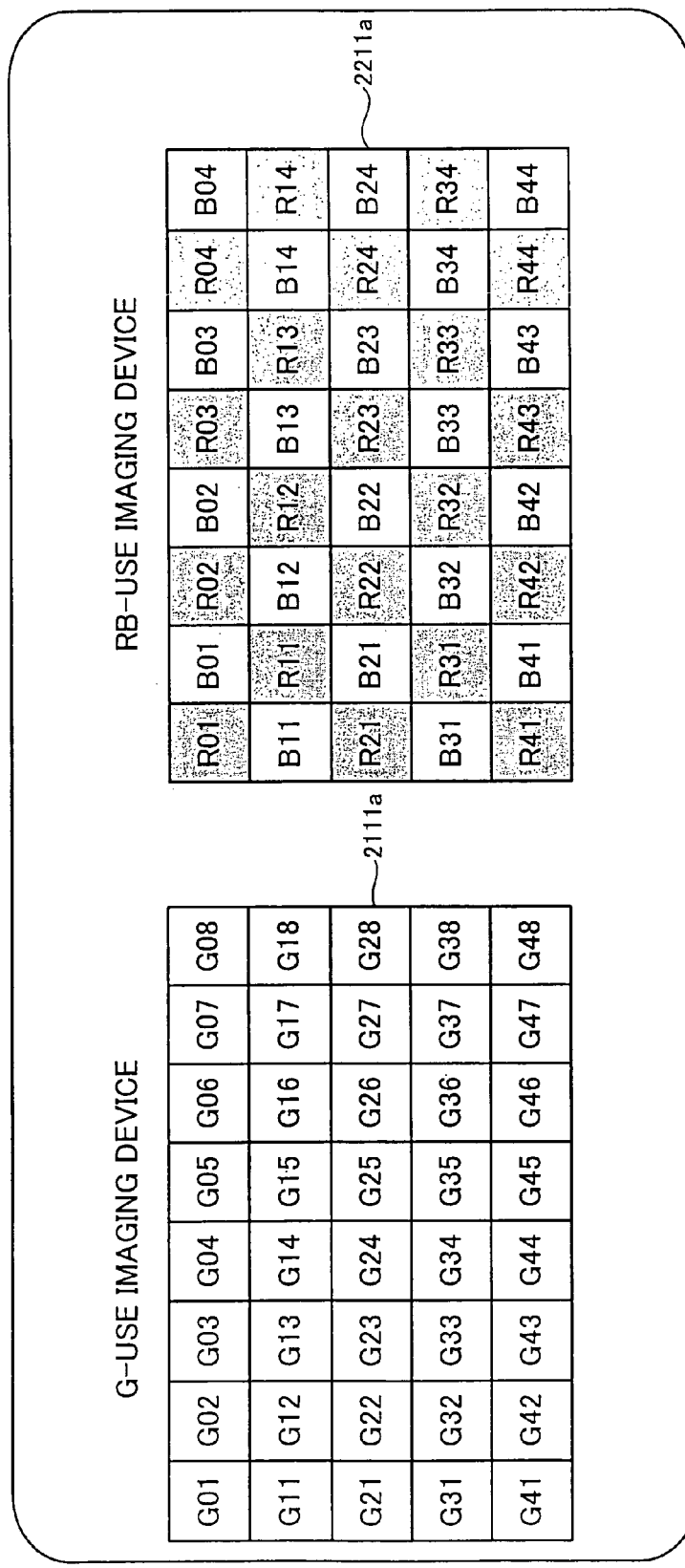
FIG. 9 is an explanatory view useful for understanding a signal processing, in which reference numbers are applied to pixels.

FIG. 9 is an explanatory view useful for understanding a signal processing, in which reference numbers are applied to pixels.

A table 1, as set forth below, shows as items brightness indicative of the subject illuminance, shutter speeds for the imaging device for the G-light (G-shutter speeds), shutter speeds for the imaging device for the R-light and the B-light (RB-shutter speeds), and signal processing contents. In the signal processing contents, the reference numbers are used for explanation. In Table 1, there is shown an example wherein ISO sensitivity is 100, F-value is 2.8, and the focal distance is 50 mm.

TABLE 1

| Luminous intensity | G-shutter speed | RB-shutter speed | Signal processing contents |
|---|---|---|---|
| 9EV and up | 1/60 and up | 1/60 and up | RGB 1:1 |
| 8EV | 1/60 | 1/30 OR 1/60 TWICE | Mix G01 + G02. Compute colors from G01 + G02 and R01, and B01. Mix G01 + G11. Compute colors from G01 + G11 and R01, and B11. |
| 7EV | 1/60 | 1/15, 1/30 TWICE, OR 1/60 FOUR TIMES | Mix four pixels for G01 + G02 + G11 + G12. Compute colors in association of RB pixels with four pixels of G. As to images requiring vertical definition, mix four pixels of G01 + G02 + G03 + G04. Compute colors in association of RB pixels with four pixels of G. As to images requiring horizontal definition, mix G01 + G11 + G21 + G31. Compute colors in association of RB pixels with four pixels of G. |
| 6EV | 1/60 | 1/8, 1/15 TWICE, 1/30 FOUR TIMES, 1/60 EIGHT TIMES | As to images requiring vertical definition, mix eight pixels of G01 + G02 + G03 + G04 + G11 + G12 + G13 + G14. Compute colors in association of RB pixels with eight pixels of G. As to images requiring horizontal definition, mix eight pixels of G01 + G11 + G21 + G31 + G02 + G12 + G22 + G32. Compute colors in association of RB pixels with eight pixels of G. |

The brightness, the G-shutter speeds, and the RB-shutter speeds, as the items, are written into the LUT 350 in FIG. 7. The arithmetic processing circuit 315, which serves also as the shutter control section, reads shutter speeds from the LUT 350 in view of the measurement result of a measurement apparatus and independently sets up the shutter speeds to the CMOS use of image taking processing circuit 312 and the RB use of image taking processing circuit 319, respectively, so that the CMOS use of image taking processing circuit 312 and the RB use of image taking processing circuit 319 drive the electronic shutter of the imaging device 111a for the G-light and the electronic shutter of the imaging device 121a for the R-light and the B-light, respectively.

Table 1 shows that for instance, when the measurement apparatus detects that the subject illuminance is not less than a predetermined brightness (here 9 EV), the arithmetic processing circuit 315 receives the detection result to set up the shutter speeds above 1/60 to both the imaging devices. Table 1 further shows that the arithmetic processing circuit 315 creates a color image through the additive process of the image signal for green, the image signal for red, and the image signal for blue with 1:1:1, as the signal contents.

Thus, in the event that the subject illuminance is well lighted such as 9 EV and sufficient sensitivity is obtained for the respective imaging device, photography can be performed through setting up of high speed shutter for both the imaging devices. Accordingly, this feature makes it possible to suppress the influence of the camera shake.

To the contrary, in the event that the subject illuminance becomes dark somewhat into about 8 EV, the shutter speeds of both the imaging devices have to be originally set up to such a long time of shutter speed exceeding the limit of the camera shake. However, according to the present embodiment, the shutter speed of the imaging device for the G-light is set up to be high speed through utilizing the fact that the G-sensitivity is increased, and only the shutter speed of the imaging device for the R-light and the B-light is set up to the long time.

Table 1 shows that in the event that the subject illuminance is 8 EV, the arithmetic processing circuit 315 sets up 1/30 seconds as the shutter speed onto the imaging device 121a for the R-light and the B-light, and sets up 1/60 seconds that is higher speed than 1/30 seconds, as the shutter speed, onto the imaging device 111a for the G-light. The 1/30 seconds is a shutter speed indicative of the limit of the camera shake and is a critical point in which an influence of the camera shake appears strongly.

In view of the foregoing, according to the present embodiment, photography is carried out in such a manner that the imaging device 111a for the G-light is set up with the high-speed shutter of 1/60 seconds so as not to appear an influence of the camera shake, while the imaging device 121a for the R-light and the B-light is set up with the shutter speed of 1/30 seconds, which is the limit of the camera shake.

It happens that when photography is carried out with the shutter speed of 1/30 seconds, which is the limit of the camera shake, an influence of the camera shake becomes large. In view of the foregoing, it is acceptable that photography is twice carried out at the shutter speed of 1/60 seconds to perform an add processing. In this manner, performing the add processing for image signals obtained through twice photography makes it possible to obtain the same sensitivity as photography at 1/30 seconds.

Twice photography is carried out with the imaging device 121a for the R-light and the B-light to once photography with the imaging device 111a for the G-light. An additive process is performed in such a manner that at first 1/60 seconds a pixel mixture (for example, G01+G02) in the horizontal direction is carried out, and at last 1/60 seconds a pixel mixture (for example, G01+G11) in the vertical direction is carried out. This feature makes it possible to easily create a color image associated with ISO sensitivity 100.

In a similar fashion, as the subject illuminance becomes dark such as 7 EV and 6 EV, the shutter speed is set up to twice and four times as many as 8 EV, the number of times of photography is varied twice and four times, and the number of pixels to be pixel-mixed is varied twice and four times. This feature makes it possible to create an image signal, which satisfy ISO sensitivity 100.

In the event that a plurality of times of photography is carried out, characteristics of images are extracted for each time and images of every time are accumulated. This feature makes it possible to correct the camera shake.

Figure 10:
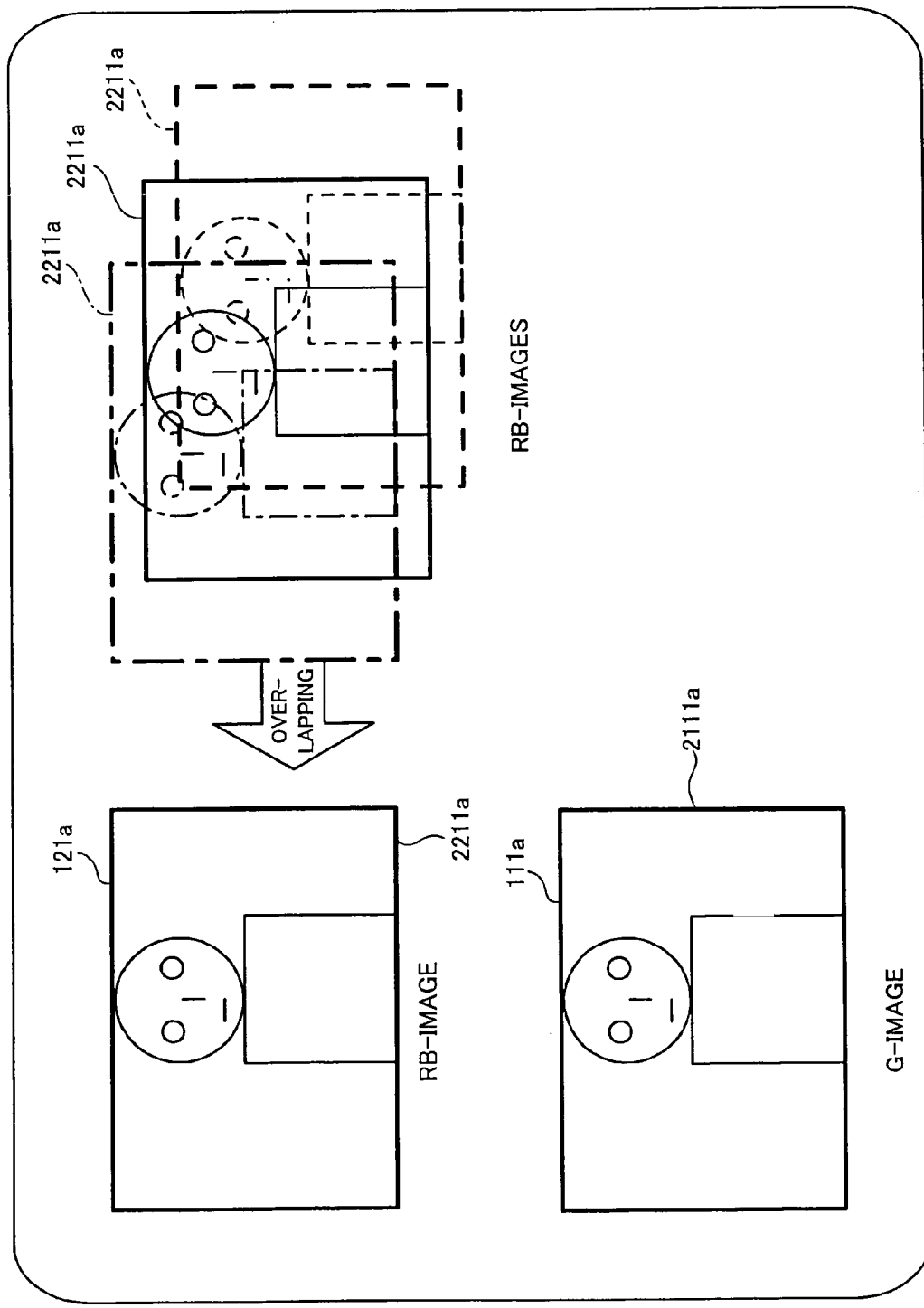
FIG. 10 is an explanatory view useful for understanding an operation of an arithmetic processing circuit, which serves also as the camera shake correction section referred to in the present invention.

FIG. 10 is an explanatory view useful for understanding an operation of the arithmetic processing circuit 315, which serves also as the camera shake correction section referred to in the present invention.

Upper left of FIG. 10, there is shown an RB image after correction of the camera shake by the arithmetic processing circuit 315 for images (RB images) obtained through a plural number of times of photography by the imaging device 121a for the R-light and the B-light. Upper right of FIG. 10, there are shown the RB images obtained through a plural number of times of photography. Lower left of FIG. 10, there is shown an image (G-image) obtained through once shutter operation at the side of the imaging device 111a for the G-light.

According to the present embodiment, the arithmetic processing circuit 315 is provided with a characteristics extraction function capable of extracting characteristics of the subject and superposing the extracted characteristics on one another, and a camera shake correction function as well.

Thus, while the images, which are obtained through a plural number of times of photography by the second the imaging device 121a, involve blur as shown upper right of FIG. 10, the characteristics extraction function and the camera shake correction function of the arithmetic processing circuit 315 make it possible to correct the images to the image free from the blur as shown upper left of FIG. 10. The imaging device 111a for the G-light is higher in sensitivity as compared with the conventional one. Accordingly, even if the field is darker as compared with the conventional one, it is possible to obtain a clear G-image (cf. lower left of FIG. 10) through once photography at the high-speed shutter. Thus, when the G-image appearing lower left of FIG. 10 is mixed with the RB image appearing upper left of FIG. 10, it is possible to obtain a color image signal hard to be striking in the camera shake.

In the event that there is obtained the subject illuminance exceeding the minimum light receiving sensitivity of the imaging device 121a for the R-light and the B-light, as mentioned above, it is possible to correct the blur with a plural number of times of image signals that are created by the imaging device 121a for the R-light and the B-light. However, in the event that the subject illuminance becomes dark, it happens that it is difficult to extract characteristics from once image signal.

In view of the foregoing, in the event that the subject illuminance becomes relatively dark, the shutter operation is performed plural number of times in synchronism with the imaging device 111a for the G-light and the imaging device 121a for the R-light and the B-light so as to generate image signals plural number of times. It is effective that the arithmetic processing circuit 315, which also serves as a blur correction section, detects blur of the image signals of a plural number of times that are obtained by the imaging device 111a for the G-light in accordance with the image signals of a plural number of times, and corrects the blur of the image signals of a plural number of times that are obtained by the imaging device 121a for the R-light and the B-light in accordance with a result of the blur detection and superposes the image signals of a plural number of times that are obtained by the imaging device 121a for the R-light and the B-light on one another.

Figure 11:
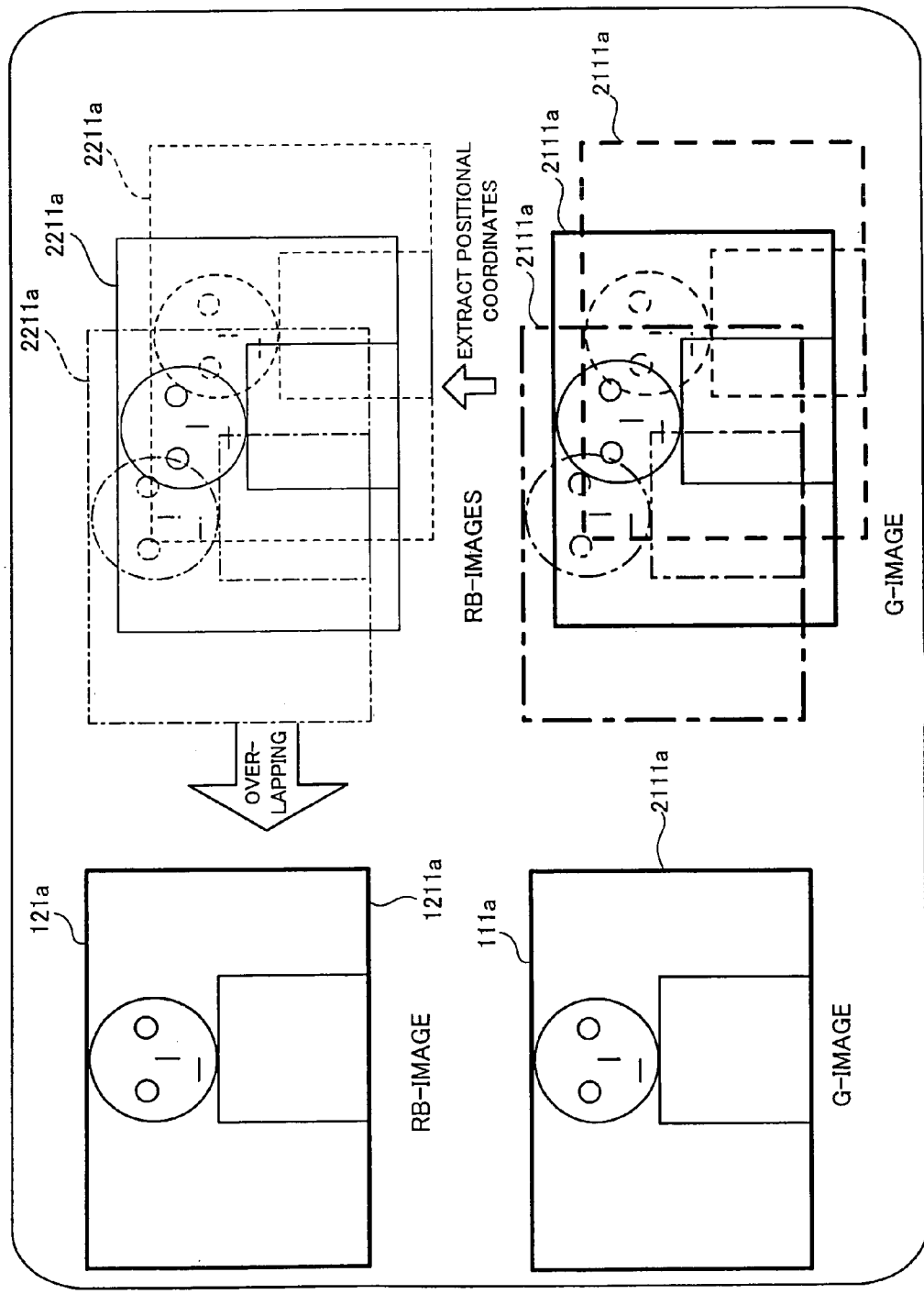
FIG. 11 is an explanatory view useful for understanding a case where a plurality of number of times of photography is carried out also at the side of the imaging devices for G-use.

FIG. 11 is an explanatory view useful for understanding processing in a case where when the subject illuminance is dark, all the images obtained by the imaging device 121a for the R-light and the B-light are shortage in exposure.

As shown in FIG. 11, in view of the fact that the imaging device 111a for the G-light is higher in sensitivity that the imaging device 121a for the R-light and the B-light, the blur is detected using the image signals of a plural number of times, which are created by the imaging device 111a for the G-light, so that a result of the blur detection is reflected to the imaging device 121a for the R-light and the B-light to correct the blur of the RB-image.

This feature makes it possible to implement an image taking apparatus that is hard to be striking in camera shake and the subject shake up to the darker field as compared with the image taking apparatus explained in conjunction with FIG. 10.

According to the present embodiment, there is disclosed an example of an image taking apparatus using the dichroic mirror. However, it is acceptable that the present invention is concerned with a twin-lens image taking apparatus wherein the imaging device 111a and the imaging device 121a for the R-light and the B-light have each the associated image taking optical system, without spectrum by the dichroic mirror.

As mentioned above, according to the present invention, it is possible to implement an image taking apparatus, in which camera shake and subject shake are hard to be striking up to a relatively darker field.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image taking apparatus having an image taking optical system, which catches a subject light coming via the image taking optical system to generate image signals, wherein the image taking apparatus has a light receiving unit comprising:
   a color separation mirror that separates the subject light coming via the image taking optical system into a reflection subject light of a green wavelength band and transmission subject lights of a red wavelength band and a blue wavelength band;
   a first imaging device that receives the reflection subject light to generate an image signal for green; and
   a second imaging device that separately receives the transmission subject lights light into a light of the red wavelength band and a light of the blue wavelength band to generate an image signal for red and an image signal for blue,
   wherein the image taking apparatus further comprises a focusing device that performs a focusing control for the image taking optical system in accordance with the image signal obtained by the first imaging device, and
   wherein the focusing device performs the focus control according to a single color.

2. An image taking apparatus according to claim 1, wherein the first imaging device is a CMOS imaging device, and the focusing device reads from the CMOS imaging device only partial image signals associated with one or plural partial areas of a light receiving area for the subject light of the CMOS imaging device and performs the focusing control for the image taking optical system in accordance with the partial image signals.

3. An image taking apparatus according to claim 1, wherein the image taking apparatus further comprises: a camera head having the image taking optical system and the light receiving unit; and a camera main frame on which the camera head is detachably mounted, the camera main frame being adapted to receive the image signal from the camera head to perform signal processing.

4. An image taking apparatus according to claim 3, wherein the camera head has the focusing device that performs a focusing control for the image taking optical system in accordance with the image signal obtained by the first imaging device.

5. An image taking apparatus according to claim 1, wherein said focusing device performs a contrast auto focus operation in accordance with a brightness signal created by the first imaging device.

6. An image taking apparatus according to claim 1, wherein the first imaging device is a CMOS imaging device and reads out only an image signal from a predetermined auto focusing area of the CMOS device in a period shorter than when the image signal is not read out from the predetermined auto focusing area.

7. An image taking apparatus according to claim 5, wherein the first imaging device is a CMOS imaging device and reads out only an image signal from a predetermined auto focusing area of the CMOS device in a period shorter than when the image signal is not read out from the predetermined auto focusing area.

8. An image taking apparatus according to claim 5, wherein the image taking apparatus further comprises: a camera head having the image taking optical system and the light receiving unit; and a camera main frame on which the camera head is detachably mounted, the camera main frame being adapted to receive the image signal from the camera head to perform signal processing.

9. An image taking apparatus according to claim 6, wherein the image taking apparatus further comprises: a camera head having the image taking optical system and the light receiving unit; and a camera main frame on which the camera head is detachably mounted, the camera main frame being adapted to receive the image signal from the camera head to perform signal processing.

10. An image taking apparatus according to claim 7, wherein the image taking apparatus further comprises: a camera head having the image taking optical system and the light receiving unit; and a camera main frame on which the camera head is detachably mounted, the camera main frame being adapted to receive the image signal from the camera head to perform signal processing.

11. An image taking apparatus according to claim 1, wherein the subject is calculated by said focusing device to be located at a position where a contrast is a maximum.

12. An image taking apparatus having an image taking optical system, which catches a subject light coming via the image taking optical system to generate image signals, wherein the image taking apparatus comprises:
   a first imaging device that receives a light of a green wavelength band of the subject light coming via the image taking optical system to generate an image signal for green;
   a second imaging device that separately receives the subject lights coming via the image taking optical system into a light of the red wavelength band and a light of the blue wavelength band to generate an image signal for red and an image signal for blue; and
   a shutter control section that independently controls a shutter speed of the first imaging device and a shutter speed of the second imaging device.

13. An image taking apparatus according to claim 12, wherein the image taking apparatus further comprises a color separation mirror that reflects a light of a green wavelength band of the subject light coming and transmits a light of a red wavelength band and a light of a blue wavelength band.

14. An image taking apparatus according to claim 12, wherein the shutter control section controls the shutter speed of the first imaging device and the shutter speed of the second imaging device in such a manner that the shutter speed of the first imaging device is same as the shutter speed of the second imaging device or higher than the shutter speed of the second imaging device in accordance with image taking conditions.

15. An image taking apparatus according to claim 14, wherein the image taking conditions includes at least one of a subject illuminance, a focal length, a sensitivity of an imaging device, and F-value.

16. An image taking apparatus according to claim 12, wherein the shutter control section controls the shutter speed of the first imaging device and the shutter speed of the second imaging device in such a manner that the shutter speed of the first imaging device is higher than the shutter speed of the second imaging device in accordance with image taking conditions.

17. An image taking apparatus according to claim 12, wherein the shutter control section independently controls the shutter speed of the first imaging device and the shutter speed of the second imaging device at mutually different shutter speeds.

18. An image taking apparatus according to claim 12, wherein the control of the shutter speed of the first imaging device and the shutter speed of the second imaging device by the shutter control section is automated in accordance with image taking conditions.

19. An image taking apparatus having an image taking optical system, which catches a subject light coming via the image taking optical system to generate image signals, wherein the image taking apparatus comprises:
   a first imaging device that receives a light of a green wavelength band of the subject light coming via the image taking optical system to generate an image signal for green;
   a second imaging device that separately receives the subject lights coming via the image taking optical system into of a light into a light of the red wavelength band and a light of the blue wavelength band to generate an image signal for red and an image signal for blue; and
   a shutter control section that independently controls a shutter speed of the first imaging device and a shutter speed of the second imaging device, wherein the shutter control section performs a shutter operation by plural number of times on at least the second imaging device to create image signals by plural number of times, and
   the image taking apparatus further comprises a blur correction section that corrects blur of the image signals by plural number of times and superposes the image signals on one another.

20. An image taking apparatus according to claim 19, wherein the shutter control section performs the shutter operation plural number of times in synchronism with the first imaging device and the second imaging device to generate image signals plural number of times, and
   the blur correction section detects blur of the image signals of a plural number of times that are obtained by the first imaging device in accordance with the image signals of a plural number of times, and corrects the blur of the image signals of a plural number of times that are obtained by the second imaging device in accordance with a result of the blur detection and superposes the image signals of a plural number of times that are obtained by the second imaging device on one another.

21. An image taking apparatus having an image taking optical system, which catches a subject light coming via the image taking optical system to generate image signals, wherein the image taking apparatus comprises:
   a color separation mirror that separates an incident light into a reflection light of a green wavelength band and transmission lights of a red wavelength band and a blue wavelength band;
   a first imaging device that receives a light of the green wavelength band of the subject light coming via the image taking optical system to generate an image signal for green;
   a second imaging device that separately receives the subject lights coming via the image taking optical system into a light of the red wavelength band and a light of the blue wavelength band to generate an image signal for red and an image signal for blue; and
   a shutter control section that independently controls a shutter speed of the first imaging device and a shutter speed of the second imaging device,
   wherein the shutter control section controls the shutter speed of the first imaging device and the shutter speed of the second imaging device in such a manner that the shutter speed of the first imaging device is the same as the shutter speed of the second imaging device or higher than the shutter speed of the second imaging device in accordance with image taking conditions in accordance with a table including at least one of a subject illuminance, a focal length, a sensitivity of an imaging device, and F-value.

22. An image taking apparatus according to claim 21, wherein the image taking apparatus further comprises: a camera head having the image taking optical system and the light receiving unit; and a camera main frame on which the camera head is detachably mounted, the camera main frame being adapted to receive the image signal from the camera head to perform signal processing.

23. An image taking apparatus having an image taking optical system, which catches a subject light coming via the image taking optical system to generate image signals, wherein the image taking apparatus comprises:
   a color separation mirror that separates an incident light into a reflection light of a green wavelength band and transmission lights of a red wavelength band and a blue wavelength band;
   a first imaging device that receives a light of the green wavelength band of the subject light coming via the image taking optical system to generate an image signal for green;
   a second imaging device that separately receives the subject lights coming via the image taking optical system into of a light into a light of the red wavelength band and a light of the blue wavelength band to generate an image signal for red and an image signal for blue; and
   a shutter control section that independently controls a shutter speed of the first imaging device and a shutter speed of the second imaging device, wherein a first shutter and a second shutter are arranged right before the first imaging device and the second imaging device, respectively, and wherein the shutter control section performs a shutter operation by plural number of times on at least the second imaging device to create image signals by plural number of times, and
   the image taking apparatus further comprises a blur correction section that corrects blur of the image signals by plural number of times and superposes the image signals on one another.

24. An image taking apparatus according to claim 23, wherein the shutter control section performs the shutter operation plural number of times in synchronism with the first imaging device and the second imaging device to generate image signals plural number of times, and
   the blur correction section detects blur of the image signals of a plural number of times that are obtained by the first imaging device in accordance with the image signals of a plural number of times, and corrects the blur of the image signals of a plural number of times that are obtained by the second imaging device in accordance with a result of the blur detection and superposes the image signals of a plural number of times that are obtained by the second imaging device on one another.

25. An image taking apparatus according to claim 23, wherein the image taking apparatus further comprises: a camera head having the image taking optical system and the light receiving unit; and a camera main frame on which the camera head is detachably mounted, the camera main frame being adapted to receive the image signal from the camera head to perform signal processing.

26. An image taking apparatus according to claim 24, wherein the image taking apparatus further comprises: a camera head having the image taking optical system and the light receiving unit; and a camera main frame on which the camera head is detachably mounted, the camera main frame being adapted to receive the image signal from the camera head to perform signal processing.

27. An image taking apparatus having an image taking optical system, which catches a subject light coming via the image taking optical system to generate image signals, wherein the image taking apparatus comprises:
   a first imaging device that receives a light of a green wavelength band of the subject light coming via the image taking optical system to generate an image signal for green;
   a second imaging device that separately receives the subject lights coming via the image taking optical system into a light of the red wavelength band and a light of the blue wavelength band to generate an image signal for red and an image signal for blue; and
   a shutter control section that independently controls a shutter speed of the first imaging device and a shutter speed of the second imaging device, wherein the shutter control section controls the shutter speed of the first imaging device and the shutter speed of the second imaging device in such a manner that the shutter speed of the first imaging device is same as the shutter speed of the second imaging device or higher than the shutter speed of the second imaging device in accordance with image taking conditions.

28. An image taking apparatus according to claim 27, wherein the image taking apparatus further comprises a color separation mirror that reflects a light of a green wavelength band of the subject light coming and transmits a light of a red wavelength band and a light of a blue wavelength band.

29. An image taking apparatus according to claim 27, wherein the image taking conditions includes at least one of a subject illuminance, a focal length, a sensitivity of an imaging device, and F-value.

30. An image taking apparatus according to claim 27, wherein the shutter control section controls the shutter speed of the first imaging device and the shutter speed of the second imaging device in such a manner that the shutter speed of the first imaging device is higher than the shutter speed of the second imaging device in accordance with image taking conditions.

31. An image taking apparatus according to claim 27, wherein the shutter control section independently controls the shutter speed of the first imaging device and the shutter speed of the second imaging device at mutually different shutter speeds.

32. An image taking apparatus according to claim 27, wherein the control of the shutter speed of the first imaging device and the shutter speed of the second imaging device by the shutter control section is automated in accordance with image taking conditions.

* * * * *